United States Patent
Avraham et al.

(10) Patent No.: US 11,556,274 B1
(45) Date of Patent: Jan. 17, 2023

(54) ENDURANCE GROUPS ECC ALLOCATION

(71) Applicant: Western Digital Technologies, Inc., San Jose, CA (US)

(72) Inventors: Dudy David Avraham, Even Yehuda (IL); Ran Zamir, Ramat Gan (IL); Judah Gamliel Hahn, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/464,384

(22) Filed: Sep. 1, 2021

(51) Int. Cl.
*G06F 3/00* (2006.01)
*G06F 3/06* (2006.01)

(52) U.S. Cl.
CPC ......... *G06F 3/0655* (2013.01); *G06F 3/0604* (2013.01); *G06F 3/0631* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,527,831 B2 | 9/2013 | Li et al. | |
| 8,949,555 B1 | 2/2015 | Karamcheti et al. | |
| 9,037,870 B1 | 5/2015 | Zheng et al. | |
| 10,089,175 B2 | 10/2018 | Fu et al. | |
| 10,180,874 B2 | 1/2019 | Bazarsky et al. | |
| 10,691,531 B2 | 6/2020 | Singhai et al. | |
| 10,732,895 B2 | 8/2020 | Earhart et al. | |
| 10,747,613 B2 | 8/2020 | Hanham et al. | |
| 10,866,740 B2 | 12/2020 | Benisty et al. | |
| 2012/0278530 A1 | 11/2012 | Ebsen | |
| 2015/0039909 A1 | 2/2015 | Tseng et al. | |
| 2017/0351874 A1 | 12/2017 | Kim | |
| 2018/0275923 A1 | 9/2018 | Earhart et al. | |
| 2019/0073302 A1 | 3/2019 | Allison et al. | |
| 2020/0089537 A1 | 3/2020 | Bahirat et al. | |
| 2020/0409559 A1 | 12/2020 | Sharon et al. | |
| 2021/0089234 A1 | 3/2021 | Yasui et al. | |

FOREIGN PATENT DOCUMENTS

EP 0626642 B1 7/1999

OTHER PUBLICATIONS

International Search Report and Written Opinion for International Application No. PCT/US2022/028217 dated Sep. 15, 2022.
NVM Express, Base Specification, Revision 1.4, Jun. 10, 2019, 403 pp.

*Primary Examiner* — Midys Rojas
(74) *Attorney, Agent, or Firm* — Patterson & Sheridan, LLP; Steven H. VerSteeg

(57) ABSTRACT

A data storage device includes a memory device having a plurality of endurance groups and a controller coupled to the memory device. The controller includes at least one decoder or at least one decoder group. The controller is configured to allocate a plurality of tokens to each endurance group of the plurality of endurance groups, receive a payment of tokens from an endurance group to access the at least one decoder or the at least one decoder group, and grant access to the at least one decoder or the at least one decoder group to the endurance group based on the payment of tokens. Each decoder or each decoder group is associated with the same or different payment of tokens and each endurance group has a maximum capacity of tokens.

20 Claims, 8 Drawing Sheets

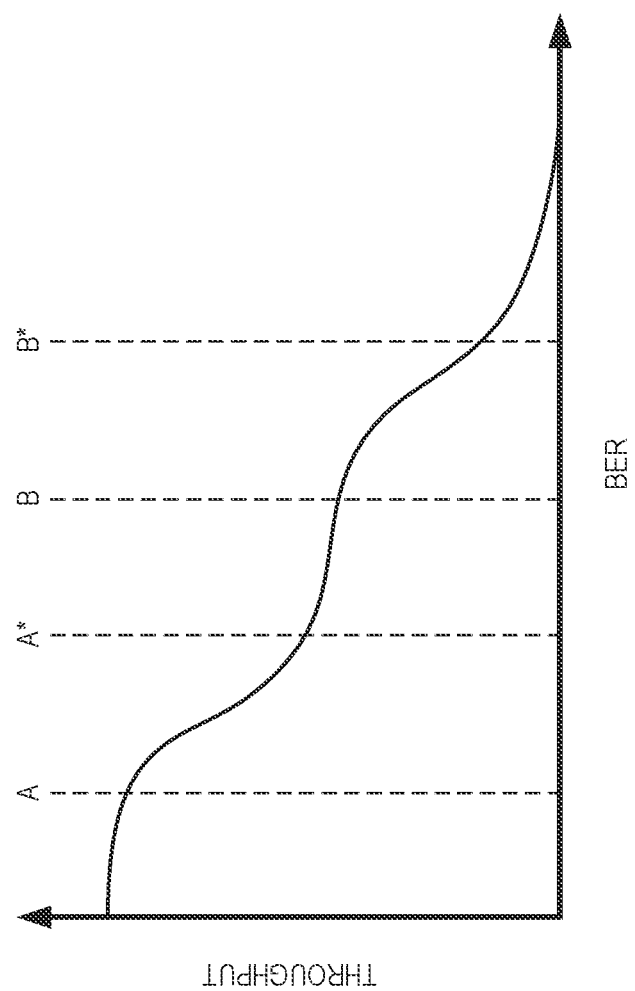

ENDURANCE GROUPS ECC ALLOCATION

BACKGROUND OF THE DISCLOSURE

Field of the Disclosure

Embodiments of the present disclosure generally relate to data storage devices, such as solid state drives (SSDs), and allocation of decoding resources per endurance group.

Description of the Related Art

In many consumer products, a host device does not directly manage dies of a non-volatile memory of a data storage device. Rather, the host device may delegate the responsibility to a controller of the data storage device and, in return, receives the full package of the data storage device (e.g., flash translation layer (FTL) information, error correction code (ECC), wear leveling, etc.). Furthermore, the data storage device has become more transparent to the host device, where the host device may be able to control and adjust the storage behavior to the host device's needs. Host devices are given more control over data storage devices through the implementation of newer specifications and protocols relating to non-volatile memory express (NVMe). The ability to control the service that each user or application (e.g., NVM set and endurance group) receives in order to ensure fairness and meet data storage device requirements per group is essential.

A data storage device may be designed to map specific dies or channels to different non-volatile memory (NVM) sets or endurance groups. The mapping may effectively split the data storage device into multiple relatively independent drives. Thus, the splitting allows for wear leveling to be spread out between the multiple relatively independent drives as well as rigidly partitioning performance. However, because components of the data storage device may be shared between the multiple relatively independent drives, requests for resources, such as decoders, may cause the data storage device to experience higher latency and produce a lower quality of service (QoS).

Thus, there is a need in the art for an improved sharing mechanism for resources of a data storage device between multiple NVM sets or endurance groups.

SUMMARY OF THE DISCLOSURE

The present disclosure generally relates to data storage devices, such as solid state drives (SSDs), and allocation of decoding resources per endurance group. A data storage device includes a memory device having a plurality of endurance groups and a controller coupled to the memory device. The controller includes at least one decoder or at least one decoder group. The controller is configured to allocate a plurality of tokens to each endurance group of the plurality of endurance groups, receive a payment of tokens from an endurance group to access the at least one decoder or the at least one decoder group, and grant access to the at least one decoder or the at least one decoder group to the endurance group based on the payment of tokens. Each decoder or each decoder group is associated with the same or different payment of tokens and each endurance group has a maximum capacity of tokens.

In one embodiment, a data storage device includes a memory device having a plurality of endurance groups and a controller coupled to the memory device. The controller includes at least one decoder. The controller is configured to allocate a plurality of tokens to each endurance group of the plurality of endurance groups, receive a payment of tokens from one or more of the plurality of endurance groups to access the at least one decoder, and grant access to the at least one decoder to the one or more of the plurality of endurance groups based on the payment of tokens.

In another embodiment, a data storage device includes a memory device having a plurality of endurance groups and a controller coupled to the memory device. The controller includes a plurality of decoders. The plurality of decoders includes a plurality of tiers based on power consumption and/or correction capability. The controller is configured to allocate a number of tokens to each of the plurality of endurance groups, receive a number of tokens from an endurance group of the plurality of endurance groups to access a decoder of the plurality of decoders, wherein each decoder of the plurality of decoders is associated with a tier of a plurality of tiers, wherein the number of tokens corresponds to an access payment for each tier of the plurality of tiers, and grant access to a decoder associated with the access payment to the endurance group.

In another embodiment, a data storage device includes a memory means having a plurality of endurance groups and a controller coupled to the memory device. The controller includes a first group of decoders and a second group of decoders. Each endurance group has a first syndrome weight threshold associated with access to the first group of decoders. Each endurance group has a second syndrome weight threshold associated with access to the second group of decoders. The controller is configured to grant access to the first group of decoders and the second group of decoders to an endurance group of the plurality of endurance group based on payment of tokens and adjust the first syndrome weight threshold, the second syndrome weight threshold, or both the first syndrome weight threshold and the second syndrome weight threshold.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 8 is an illustration of a graph showing throughput (Y) versus bit error rate (BER) with various thresholds, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and allocation of decoding resources per endurance group. A data storage device includes a memory device having a plurality of endurance groups and a controller coupled to the memory device. The controller includes at least one decoder or at least one decoder group. The controller is configured to allocate a plurality of tokens to each endurance group of the plurality of endurance groups, receive a payment of tokens from an endurance group to access the at least one decoder or the at least one decoder group, and grant access to the at least one decoder or the at least one decoder group to the endurance group based on the payment of tokens. Each decoder or each decoder group is associated with the same or different payment of tokens and each endurance group has a maximum capacity of tokens.

Figure 1:
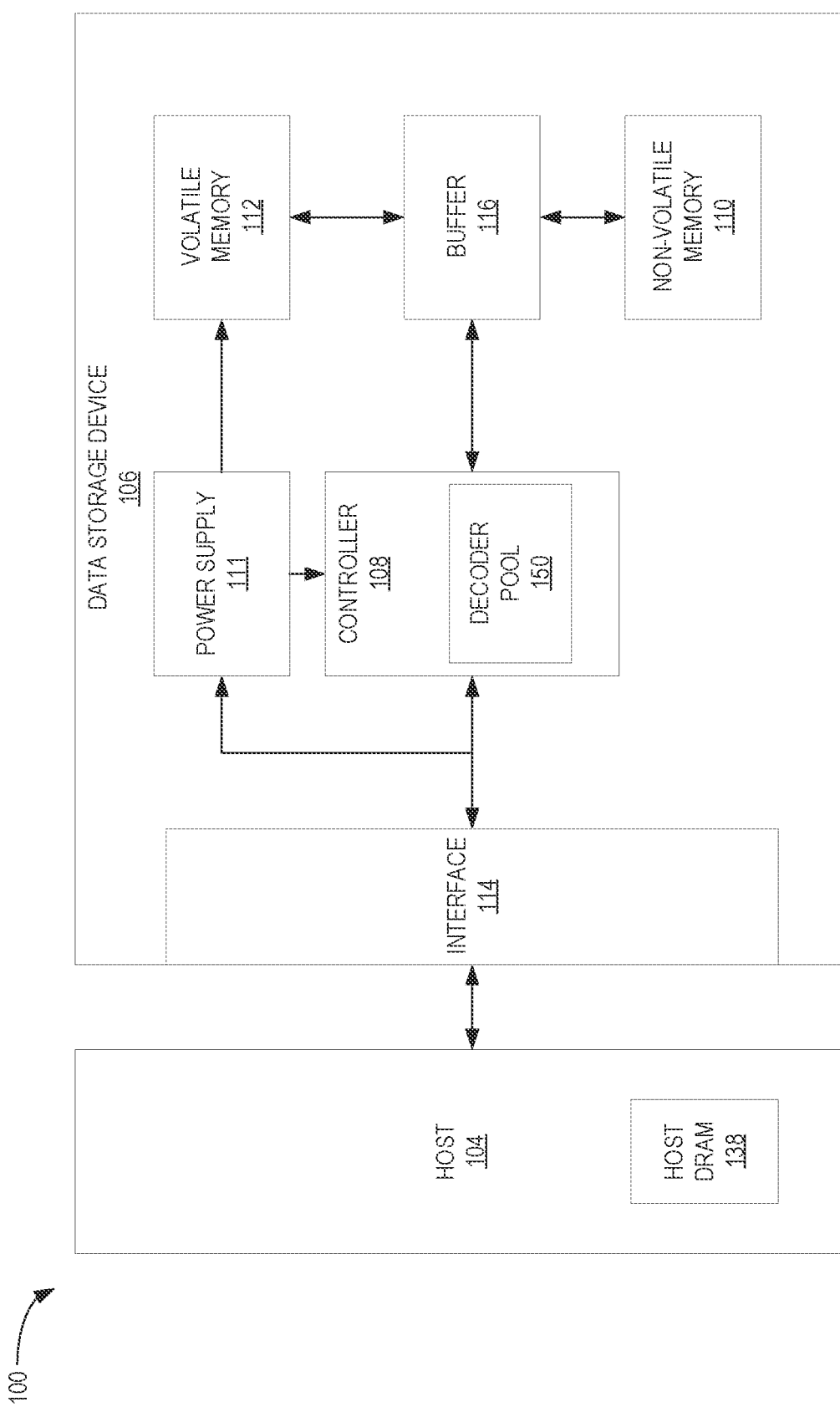
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 includes a decoder pool 150. The decoder pool 150 may be part of a low-density parity-check (LDPC) engine of the controller 108. The decoder pool 150 may include one or more decoders, where each of the one or more decoders have one or more gears. Each of the one or more gears may either be a tier 1 decoder, a tier 2 decoder, or a tier 3 decoder. The decoder tiers may be grouped as decoder groups, such that a tier 1 decoder group includes only tier 1 decoders, a tier 2 decoder group only includes tier 2 decoder, and a tier 3 decoder only includes tier 3 decoders. The exemplification of the different tiers of decoders is not intended to be limiting, but to provide an example of a possible embodiment. For example, the usage of the term "tier" may be utilized as a placeholder for different decoders specialized for different cases. Furthermore, more than or less than the exemplified tiers of decoders are contemplated.

The tier 1 decoder may be utilized for less intensive decoding tasks, such as for low bit error rate (BER) codewords and the tier 2 decoder and the tier 3 decoder may be utilized for more intensive decoding tasks, such as for higher BER codewords. In other embodiments, the selected decoder may be based on whether the receive codeword exceeds some certain syndrome weight threshold of the tier 1 decoder, the tier 2 decoder, or the tier 3 decoder. The decoder utilized may be dependent on the decoding operation as well as the current resources utilized, such as current power consumption by the other components of the data storage device. The various decoders may use a tradeoff between latency and power to correction capability, such that the tradeoff is a gear shifting scheme. For example, the tier 1 decoder may be a bit flipping decoder, while the tier 2 and the tier 3 decoders may be message passing decoders. In this context, a tier 2 decoder may be a faster message passing decoder when compared to a tier 3 decoder and the tier 3 decoder may be a stronger message passing decoder when compared to the tier 2 decoder.

Figure 2:
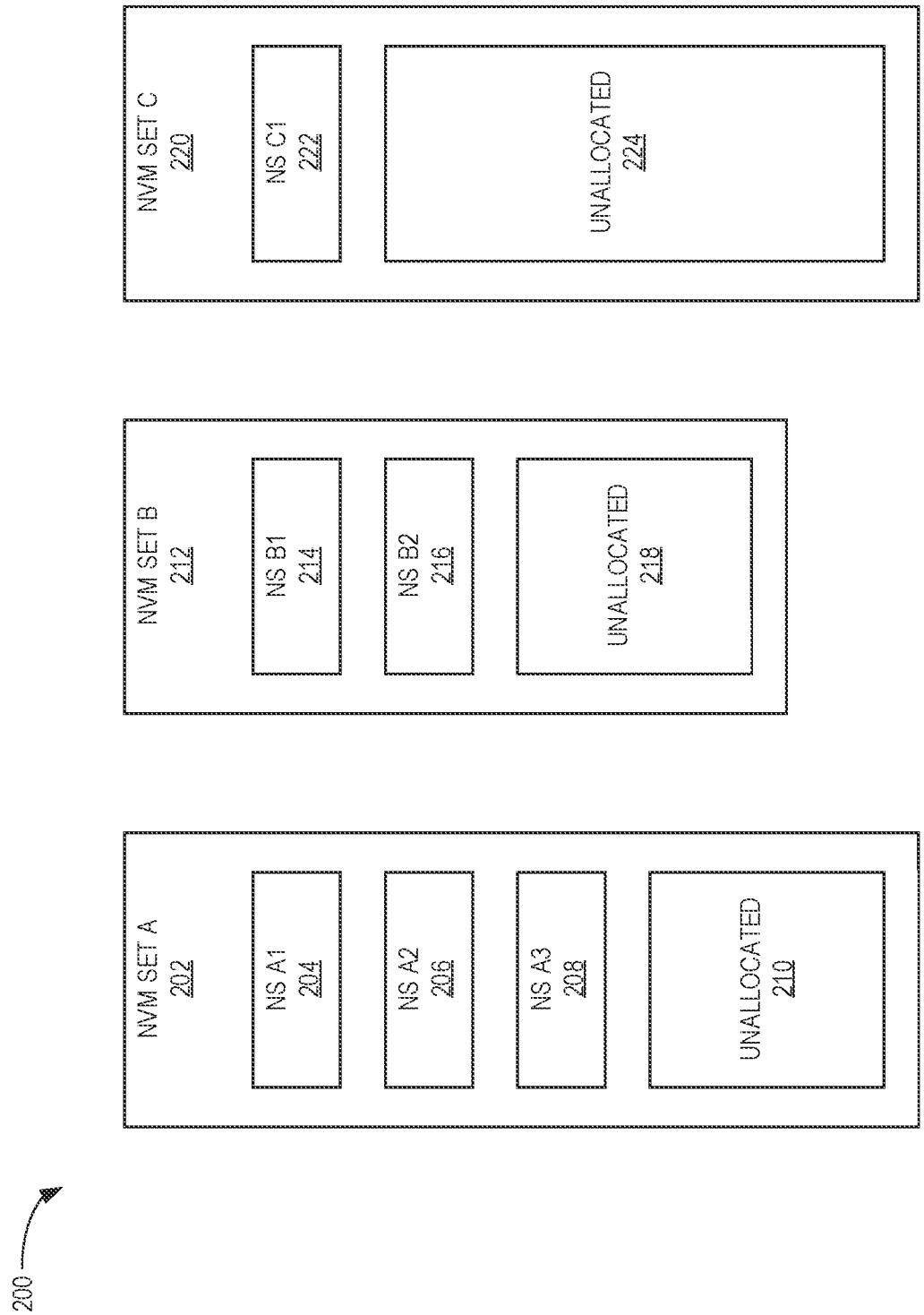
FIG. 2 is an illustration of NVM sets and associated example namespaces, according to certain embodiments.

FIG. 2 is an illustration of NVM sets and associated example namespaces, according to certain embodiments. An NVM that includes the one or more NVM sets 202, 212, 220 may be the NVM 110 of FIG. 1. Each NVM set includes one or more namespaces (NS) and an unallocated region that includes available NVM storage space not yet allocated to a namespace in the NVM set. In one embodiment, each NVM set includes the same number of namespaces. For example, a first NVM set A 202, a second NVM set B 212, and a third NVM set C 220 each includes one namespace. It is understood that the indicators "first," "second," and "third" in this context are relative and not absolute; that is, a "first" NVM set need not be the first on a die, or the first selected in a process. In another embodiment, each NVM set includes a different number of namespaces, where one or more NVM sets may have the same number of namespaces as one or more NVM sets.

In another example, a first NVM set A 202 includes three namespaces, a first NS A1 204, a second NS A2 206, and a third NS A3 208. The second NVM set B 212 includes two namespaces, a first NS B1 214 and a second NS B2 216. The third NVM set C 220 includes one namespace, a first NS C1 222. Disclosed namespaces of an NVM may be the same size in some embodiments, while in other embodiments such namespaces may be of different sizes. Moreover, a namespace may be logically allocated across multiple NVM's or on a single NVM.

Each namespace includes one or more memory locations in the NVM, where each memory location in the NVM is unique to a namespace. Furthermore, data stored in each namespace and each unallocated region of the NVM sets may be logically organized in a logical-to-physical (L2P) table. The L2P table includes pointers that point to the logical block address (LBA) of the relevant data stored in each memory location of the one or more NVM sets.

In one embodiment, each namespace of the one or more NVM sets may have the same amount of NVM storage space. For example, the first NS A1 204 and the second NS A2 206 of the first NVM set A 202 may each have the same storage space in the NVM, such as about 128 MB. In another embodiment, each namespace of the one or more NVM sets may have a different amount of NVM storage space, where one or more namespaces may have the same amount of NVM storage as one or more namespaces. In another example, the first NS A1 204 of the first NVM set A 202 may include about 128 MB of storage, and the second NS A2 206 of the first NVM set A 202 may include about 256 MB of storage. The listed values for storage capacity are not intended to be limiting, but to provide examples of possible embodiments.

In one embodiment, each unallocated region of the one or more NVM sets may have the same amount of NVM storage space. For example, an unallocated region 210 of the first NVM set A 202 and an unallocated region 218 of the second NVM set B 212 and an unallocated region 224 of the third NVM set C 220 may each have the same storage space in the NVM, such as about 512 MB. In another embodiment, each unallocated region of the one or more NVM sets may have a different amount of NVM storage space, where one or more unallocated regions may have the same amount of NVM storage as one or more unallocated regions. In another example, the unallocated region 210 of the first NVM set A 202 may include about 1024 MB of storage and the unallocated region 218 of the second NVM set B 212 may include about 512 MB of storage and the unallocated region 224 of the third NVM set C 220 may include about 750 MB of storage. The listed values for storage capacity are not intended to be limiting, but to provide examples of possible embodiments.

Figure 3:
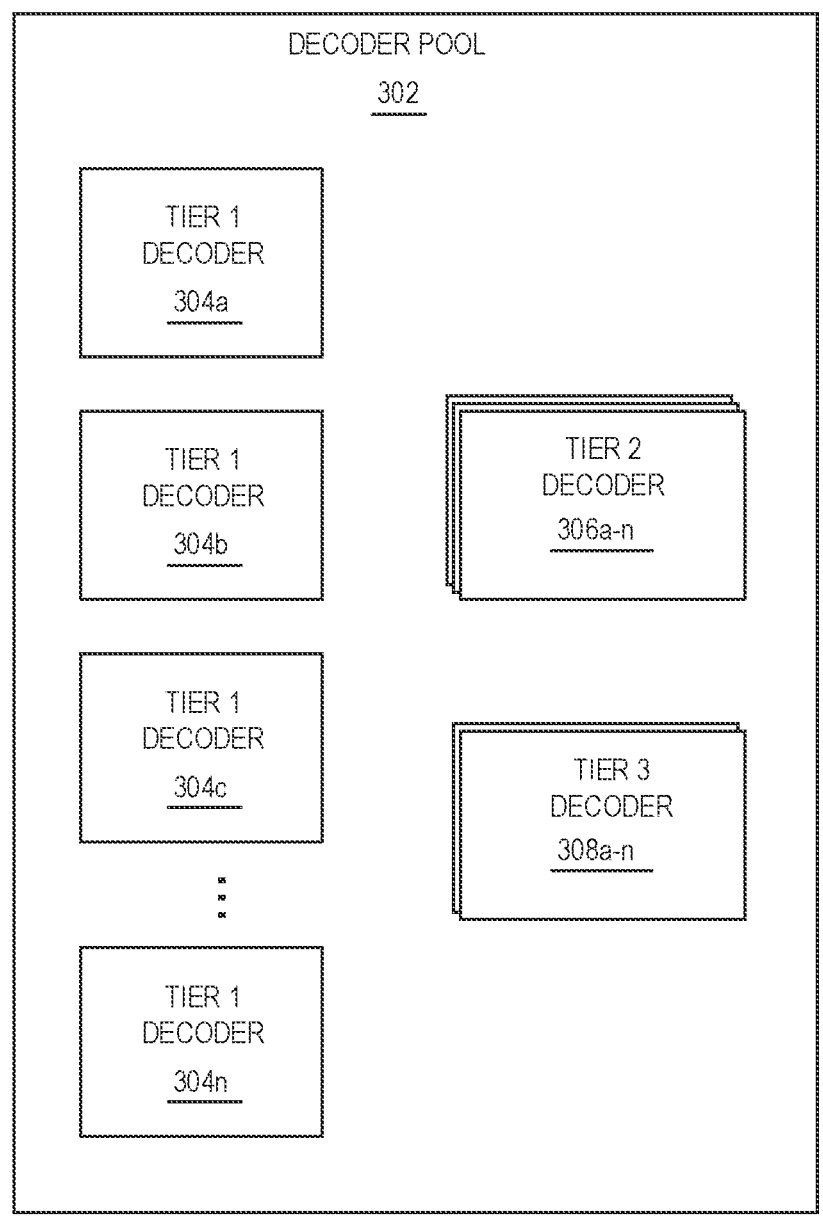
FIG. 3 is an illustration of a decoder pool architecture, according to certain embodiments.

FIG. 3 is a schematic block diagram illustrating a decoder pool architecture 300, according to disclosed embodiments. The decoder pool architecture 300 may be part of the decoder pool 150 of FIG. 1. In certain approaches, a codeword provided to a decoder pool may be provided first to a low order decoder (e.g., tier 1 decoder). However, if the low order decoder fails, such as when the codeword has a failed bit count (FBC) greater than a threshold FBC of the low order decoder, then the codeword is sent to a decoder of a higher order (e.g., tier 2 decoder and/or tier 3 decoder). Furthermore, the plurality of decoders of the decoder pool architecture 300 may be divided into groups of independent decoders. For example, a first decoder group may include only tier 1 decoders, a second decoder group may only include tier 2 decoders, and a third decoder group may only include tier 3 decoders. In one example, if a codeword using a tier 3 decoder has a long decode latency, then a controller, such as the controller 108 of FIG. 1, may still use the tier 1 decoders and the tier 2 decoders for other codeword decoding operations. The decoder pool architecture 300 includes a plurality of tier 1 decoders 304a-n, a plurality of tier 2 decoders 306a-n, and a plurality of tier 3 decoders 308a-n. In some embodiments, the number of tier 1 decoders is greater than the number of tier 2 decoders and the number of tier 2 decoders is greater than the number of tier 3 decoders.

Furthermore, the controller 108 may be configured to determine which decoder of the plurality of decoders 304a-n, 306a-n, 308a-n will decode a received codeword. The received codeword may be from volatile memory, such as the volatile memory 112 of FIG. 1, or from the NVM, such as the NVM 110 of FIG. 1. For example, if the controller 108 determines that the received codeword includes a high BER, then the received codeword may be decoded by one of the plurality of tier 3 decoders 308a-n, rather than one of the plurality of tier 1 decoders 304a-n or one of the plurality of tier 2 decoders 306a-n.

Figure 4:
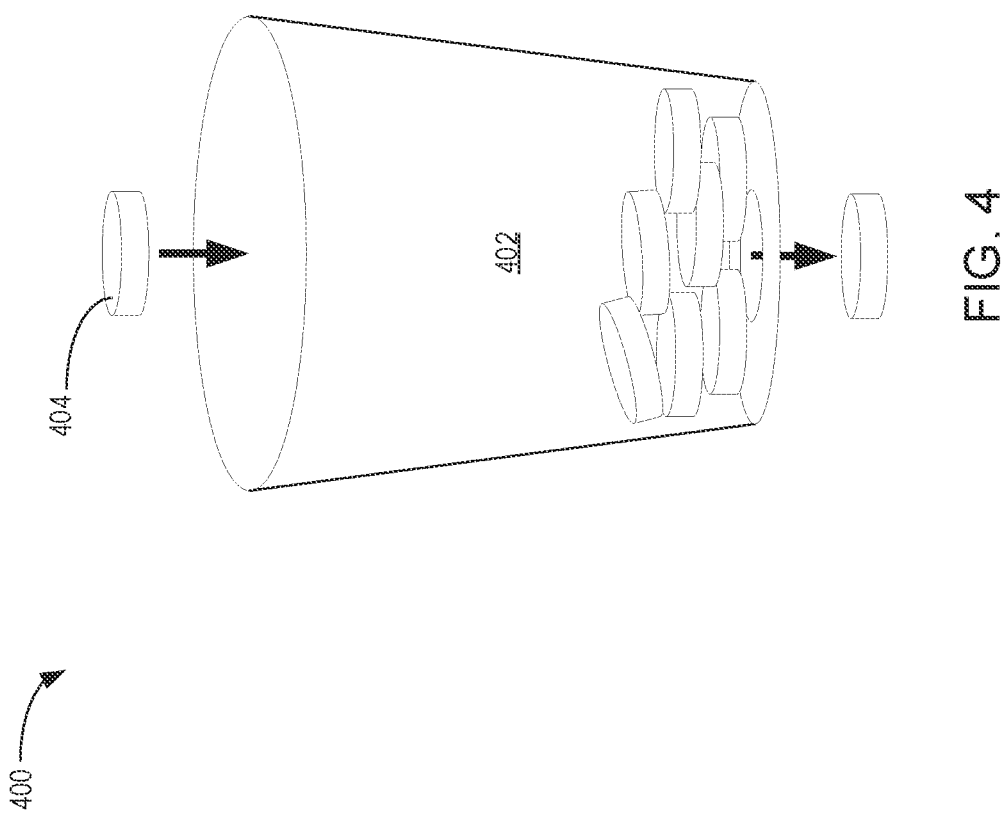
FIG. 4 is an illustration of a token bucket, according to certain embodiments.

FIG. 4 is an illustration of a token bucket 402, according to certain embodiments. The token bucket 402 may be a token bucket associated with any of the one or more NVM sets 202, 212, 220 or with each of the one or more NVM sets 202, 212, 220 of FIG. 2. The token bucket 402 includes one or more tokens 404. During initiation of a data storage device, such as the data storage device 106 of FIG. 1, or throughout operation of the data storage device 106, a controller, such as the controller 108 of FIG. 1, may allocate a number of the one or more tokens 404 to each of the one or more NVM sets 202, 212, 220. It is contemplated that the number of tokens allocated may be different between each NVM set. Furthermore, it is contemplated that less than all NVM sets may be allocated a number of the one or more tokens 404.

In one embodiment, the total number of the one or more tokens 404 is a finite number, such that the controller 108 may only allocate up to the total number of the one or more tokens 404. For example, the total number of the one or more tokens 404 may be based on statistics of the data storage device 106 and may be adjusted during the lifetime of the data storage device 106. In another embodiment, the total number of the one or more tokens 404 may be dependent on performance or quality of service (QoS) requirements. Furthermore, each token bucket 402 may have a maximum capacity of tokens.

During data storage device 106 operation, as the program/erase cycle (PEC) of the dies of the NVM 110 increases, the cell states may shift and widen, which may result in more frequent read threshold calibrations and require longer and more powerful decoding operations. In order to mitigate the effects of operating the data storage device 106 over time, the controller 108 may employ a wear leveling mechanism to ensure that each block of the NVM 110 has a similar PEC number. The wear leveling mechanism may be utilized in conjunction with endurance groups, where each NVM set of the one or more NVM sets 202, 212, 220 may be associated with an endurance group. For exemplary purposes, each of the NVM sets 202, 212, 220 may be referenced as an endurance group. For example, the first NVM set A 202 may be referred to as a first endurance group, the second NVM set B 212 may be referred to as a second endurance group, and the third NVM set C 220 may be referred to as a third endurance group.

The allocation of the one or more tokens 404 to the one or more endurance groups may be based on one or more factors in order to not exceed a bandwidth allotment. For example, the one or more factors may include a factor based on a power associated with an endurance group, a factor based on a number of decoding clocks associated with an endurance group, or a combination of the previously listed factors. It is to be understood that other factors not listed are contemplated and may be applicable to the embodiments described. The bandwidth allotment may be based on a size of an endurance group, a data type of the endurance group, an overall usage of the endurance group, or a combination of the previously listed elements.

During data storage device 106 operation, each endurance group may utilize any tokens 404 accumulated in the token bucket 402 to "pay" to access a decoder group of a decoder pool, such as the decoder pool 302 of FIG. 3. For example, a payment of 1 token to a tier 1 decoder may be sufficient to access the tier 1 decoder, a payment of 2 tokens to a tier 2 decoder may be sufficient to access the tier 2 decoder, and a payment of 3 tokens to a tier 3 decoder may be sufficient to access the tier 3 decoder. It is contemplated that an endurance group may pay more than a minimum number of tokens to access a decoder group, such that the payment may reflect a urgency or a prioritization of the access request. Furthermore, the one or more tokens 404 may provisioned by the controller 108, such that each endurance group may accumulate the one or more tokens 404 at a predetermined rate, where the predetermined rate may be the same or different for each endurance group. Because the number of the one or more tokens 404 may be finite or limited per endurance group, the decoder groups (including the decoders) of the decoder pool 302 may be fairly distributed among the endurance groups based on need due to the payment of the one or more tokens 404.

Referring back to FIG. 3, each of the plurality of decoders 304a-n, 306a-n, 308a-n may include at least a first queue and a second queue. For example, the first tier 1 decoder 304a includes a first queue, a second queue, and a third queue. Each of the queues for a decoder may be associated with a different priority level. For example, a first queue may have a first priority level, a second queue may have a second priority level, and the third queue may have a third priority level, where the first priority level has the highest priority of decoding access and the third priority level has the lowest priority of decoding access. An endurance group may pay more tokens than a minimum token amount for a decoder access in order to access a greater priority level. For example, if the third queue has a payment of 1 token, the second queue has a payment of 2 tokens, and the third queue has a payment of 3 tokens, then an endurance group may pay 3 tokens to be placed in the first queue.

Furthermore, an endurance group may pay different amount of tokens based on a data type to access the each decoder group of the plurality of decoders 304a-n, 306a-n, 308a-n. For example, the various data types may include, in a non-limiting list, backed up data, fast fail data, and data to be retrieved. Thus, an endurance group may pay more tokens for decoding of fast fail data than for backed up data, such that paying more tokens grants access to faster decoders, such as a tier 2 decoder or a tier 3 decoder.

Figure 5:
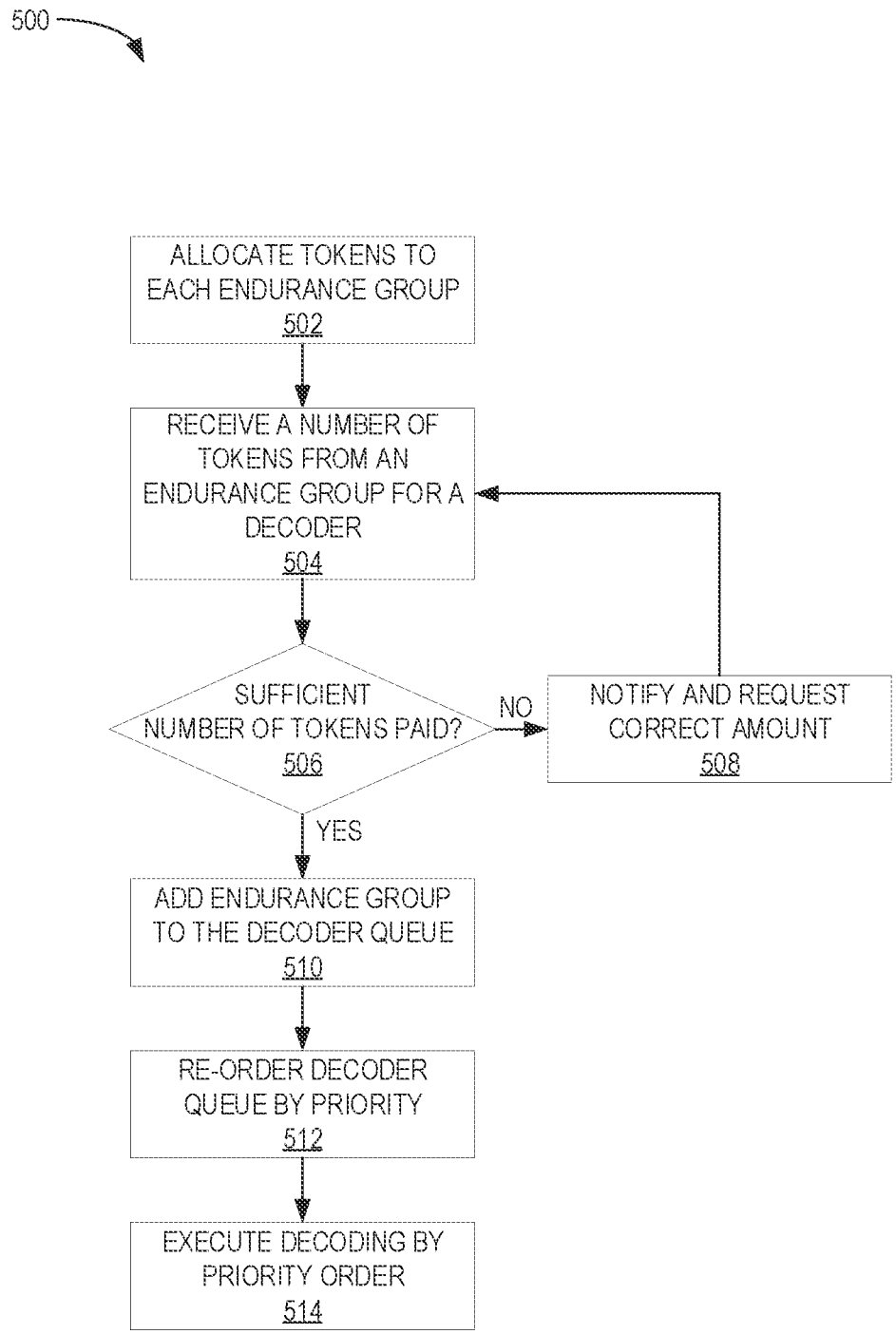
FIG. 5 is a flow diagram illustrating a method of decoder sharing, according to certain embodiments.

FIG. 5 is a flow diagram illustrating a method 500 of decoder sharing, according to certain embodiments. Method 500 may be executed by a controller, such as the controller 108 of FIG. 1, where decoders being shared may be the plurality of decoders 304a-n, 306a-n, 308a-n of FIG. 3. Furthermore, the decoders may be shared by a plurality of endurance groups, such as the one or more NVM sets 202, 212, 220 of FIG. 2.

At block 502, the controller 108 allocates one or more tokens, such as the one or more tokens 404 of FIG. 4, to each endurance group of the plurality of endurance groups. The allocation of the one or more tokens 404 may be non-uniform, such that an endurance group may receive a different allocation of the one or more tokens 404 than another endurance group. At block 504, the controller 108 receives a number of tokens from an endurance group for decoder access. The number of tokens may depend on a decoder tier, a priority level requested, a data type, or a combination of the previously listed options. Each endurance group may employ several "spending" strategies, in order to maximize or optimize token usage, according to its priorities. At block 506, the controller 108 determines if a sufficient number of tokens has been paid by the endurance group for a requested decoder group to use a decoder of the decoder group.

If the incorrect number of tokens has been paid at block 506, then at block 508, the controller 108 notifies and requests the correct amount from the endurance group. If the correct or sufficient number of tokens has been paid by the endurance group at block 506, then the controller 108 adds the endurance group to a queue of the respective decoder at block 510. By adding the endurance group to the queue to the respective decoder, the controller 108 effectively grants access to the respective decoder to the endurance group. At block 512, the controller 108 re-orders the decoder queue by priority, such that a high priority access request is executed prior to executing a lower priority access request. At block 514, the decoder decodes data associated with the endurance groups that requested access by priority order.

The priority order may allocate decoder access round robin between the queues, such that a decoder access request from the first queue is executed first, a decoder access request from the second queue is executed second, and a decoder access request from the third queue is executed third, and so-forth. Likewise, within a queue, for equal access payments, decoder access may be round robin allocated. Furthermore, access requests may be associated with a queue time, such that an access request with a queue time greater than a threshold time may be increased in priority level.

Figure 6:
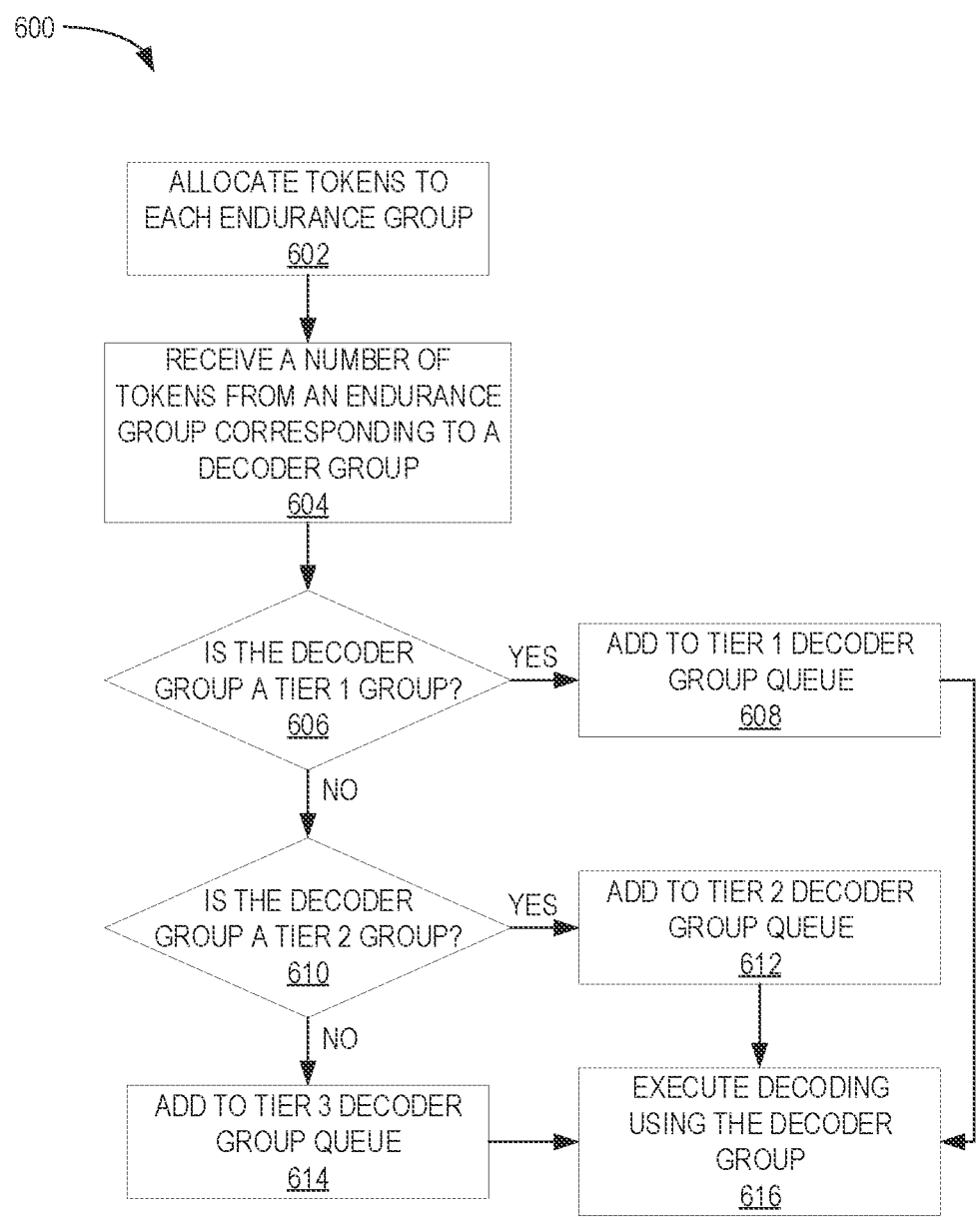
FIG. 6 is a flow diagram illustrating a method of decoder pool access, according to certain embodiments.

FIG. 6 is a flow diagram illustrating a method 600 of decoder pool access, according to certain embodiments. Method 600 may be executed by a controller, such as the controller 108 of FIG. 1, where the decoder pool being accessed may be the plurality of decoders 304a-n, 306a-n, 308a-n of FIG. 3. Furthermore, the decoders may be shared by a plurality of endurance groups, such as the one or more NVM sets 202, 212, 220 of FIG. 2.

At block 602, the controller 108 allocates one or more tokens, such as the one or more tokens 404 of FIG. 4, to each endurance group of the plurality of endurance groups. The allocation of the one or more tokens 404 may be non-uniform, such that an endurance group may receive a different allocation of the one or more tokens 404 than another endurance group. At block 604, the controller 108 receives a number of tokens from an endurance group for decoder access (e.g., access a decoder group of the decoder pool). The number of tokens may depend on a decoder tier, a priority level requested, a data type, or a combination of the previously listed options. Each endurance group may employ several "spending" strategies, in order to maximize or optimize token usage, according to its priorities.

At block 606, the controller 108 determines if the requested decoder group is a tier 1 group. If the requested decoder group is a tier 1 group at block 606, then then the decoder access request from the endurance group is added to a tier 1 decoder group queue at block 608. However, if the decoder group requested is not a tier 1 decoder group at block 606, then the controller 108 determines if the requested decoder group is a tier 2 group at block 610. If the requested decoder group is a tier 2 group at block 610, then then the decoder access request from the endurance group is added to a tier 2 decoder group queue at block 612. However, if the decoder group requested is not a tier 2 decoder group at block 610, then the controller 108 adds the decoder access request from the endurance group to the tier 3 decoder group queue at block 614. It is to be understood that there may be more or less decoder group tiers and the embodiments described with method 600 may be implemented with the more or less decoder group tiers.

At block 616, the decoding is executing using each respective decoder group by the queue order. In some examples, the queue order may be re-ordered by priority prior to executing decoding access requests. Furthermore, access requests may be associated with a queue time, such that an access request with a queue time greater than a threshold time may be increased in priority level. Thus, the ability of any endurance group to block access of other endurance groups may be limited in order to spread decoder access and utilization fairly.

Figure 7:
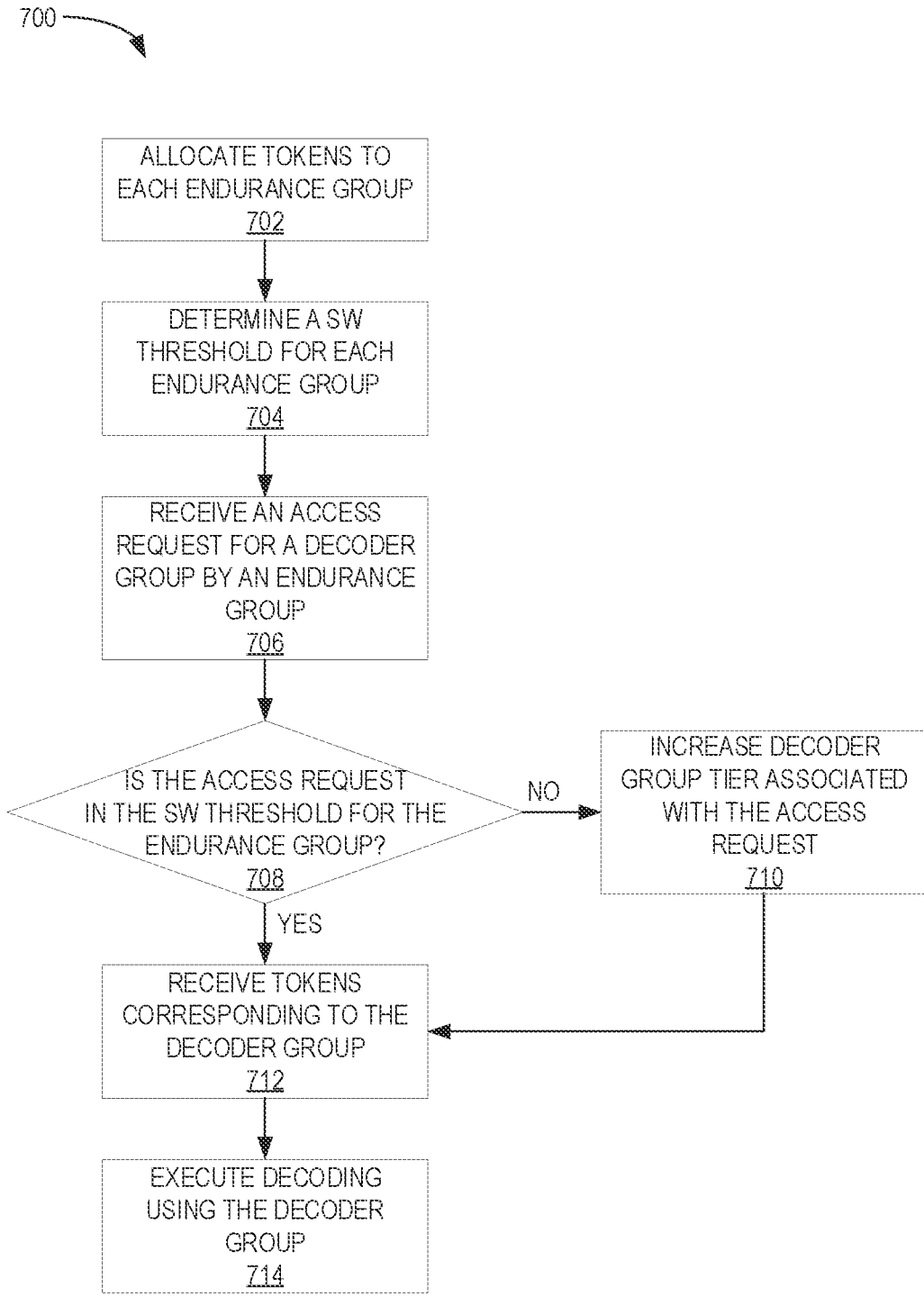
FIG. 7 is a flow diagram illustrating a method of syndrome weight (SW) threshold filtering, according to certain embodiments.

FIG. 7 is a flow diagram illustrating a method 700 of syndrome weight (SW) threshold filtering, according to certain embodiments. Method 700 may be executed by a controller, such as the controller 108 of FIG. 1, where decoders described herein may be the plurality of decoders 304a-n, 306a-n, 308a-n of FIG. 3. Furthermore, the decoders may be shared by a plurality of endurance groups, such as the one or more NVM sets 202, 212, 220 of FIG. 2.

At block 702, the controller 108 allocates one or more tokens, such as the one or more tokens 404 of FIG. 4, to each endurance group of the plurality of endurance groups. The allocation of the one or more tokens 404 may be non-uniform, such that an endurance group may receive a different allocation of the one or more tokens 404 than another endurance group. At block 704, the controller 108 determines a syndrome weight (SW) threshold for each endurance group. A SW may be defined as a number of equations that are not satisfied in a low-density parity-check (LDPC) code and other ECC codes, which may be utilized by a decoder. As the bit error rate (BER) increases, a greater number of equations may not be satisfied. It is to be understood that the SW threshold may be adjusted throughout the operation of a data storage device, such as the data storage device 106 of FIG. 1, based on usage, data type, temperature, and the like.

At block 706, the controller 108 receives an access request from an endurance group corresponding to a decoder group. At block 708, the controller 108 determines if the access request is within the SW threshold corresponding to a respective decoder group for the endurance group. If the access request is not within the SW threshold corresponding to a decoder group for the endurance group at block 708, then the controller 108 increases the decoder group tier associated with the access request at block 710. At block 712, the controller 108 receives one or more tokens 404 corresponding to a payment for the decoder group tier. At block 714, the decoder executes the decoding for the access request.

FIG. 8 is an illustration of a graph 800 showing throughput (Y) versus bit error rate (BER), according to certain embodiments. Graph 800 illustrates example SW thresholds that may be utilized during the determining step at block 704 of method 700. Furthermore, during data storage device, such as the data storage device 106 of FIG. 1, operation, a controller, such as the controller 108 of FIG. 1, may adjust the SW thresholds as needed. For example, the SW thresholds may be adjusted based on resource availability, system state, bandwidth availability, decoder availability, history of recent decoder access requests (e.g., an endurance group that sends a large amount of failing flash memory units (FMUs) or blocks to a low tier decoder may have its SW thresholds adjusted so that those same requests will be for a mid to high tier decoder), quality of service (QOS) requirements, and the like.

For example, a tier 1 decoder may be utilized for decoding requests with a BER below threshold A*, a tier 2 decoder may be utilized for decoding requests with a BER between threshold A* and threshold B*, and a tier 3 decoder may be utilized for decoding requests with a BER above threshold B*. However, during data storage device operation, the controller 108 determines that a first endurance group has been sending a large amount of decoder access requests for a tier 1 decoder. Normally, those decoder access requests may be sufficiently executed by a tier 1 decoder. However, because the large number of decoder access requests, the tier 1 decoder group may be bottlenecked, thus not allowing other endurance groups to use the tier 1 decoders. Therefore, the SW threshold for the first endurance group may be decreased from A* to A in order to force the endurance group to use a tier 2 decoder. Because the endurance group does not have an infinite number of tokens allocated, the endurance group may be limited in the number of decoder access requests that it may initiate.

Manipulating access to certain decoder groups may be completed in both directions (i.e., increasing or decreasing the SW thresholds) by either limiting access to lower tier decoder groups to save throughput for other users or enforcing decoding with lower tier decoder groups to ensure that the higher tier decoder groups are free for other users in order to improve QoS. Furthermore, it is contemplated that the SW thresholds may be implemented as a range. For example, an endurance group may have SW threshold range of between A and A*, where the controller 108 may determine whether to use a tier 1 decoder or a tier 2 decoder for a BER between the two SW thresholds. The controller 108 may decide to use the tier 1 decoder or the tier 2 decoder based on QoS constraints, resource constraints, and the like. Furthermore, the controller 108 may adjust each SW threshold during the operation of the data storage device 106. For example, the controller 108 may determine an impact on QoS for each endurance group and/or the remaining endurance groups each time an endurance group is granted access to a decoder and adjust the relevant SW thresholds based on the determined impact.

By using a payment system to access decoders, better sharing of system resources for each endurance group may result which may improve overall performance.

In one embodiment, a data storage device includes a memory device having a plurality of endurance groups and a controller coupled to the memory device. The controller includes at least one decoder. The controller is configured to allocate a plurality of tokens to each endurance group of the plurality of endurance groups, receive a payment of tokens from one or more of the plurality of endurance groups to access the at least one decoder, and grant access to the at least one decoder to the one or more of the plurality of endurance groups based on the payment of tokens.

The allocation of the plurality of tokens to an endurance group of the plurality of endurance groups is based on a number of decoding clocks associated with the endurance group. The allocation of the plurality of tokens to an endurance group of the plurality of endurance groups is based on an allocated power associated with the endurance group. The allocation of the plurality of tokens to an endurance group of the plurality of endurance groups is based on a combination of a number of decoding clocks and an allocated power associated with the endurance group. Each endurance group has a maximum allowance of tokens. The at least one decoder includes at least two queues. Each of the at least two queues is associated with a priority for decoding. A first queue has a first priority and second queue has a second priority. The at least one decoder prioritizes the first priority over the second priority. Each endurance group spends a different number of tokens of the plurality of tokens based on a data type of the endurance group. The data type includes backed up data, fast fail data, and data to be retrieved. An allowance of bandwidth to an endurance group of the plurality of endurance groups is based on one or more of a size of the endurance group, a data type of the endurance group, and an overall usage of the endurance group.

In another embodiment, a data storage device includes a memory device having a plurality of endurance groups and a controller coupled to the memory device. The controller includes a plurality of decoders. The plurality of decoders includes a plurality of tiers based on power consumption and correction capability. The controller is configured to allocate a number of tokens to each of the plurality of endurance groups, receive a number of tokens from an endurance group of the plurality of endurance groups to access a decoder of the plurality of decoders, wherein each decoder of the plurality of decoders is associated with a tier of a plurality of tiers, wherein the number of tokens corresponds to an access payment for each tier of the plurality of tiers, and grant access to a decoder associated with the access payment to the endurance group.

The plurality of tiers includes at least a first tier and a second tier, wherein the access payment for the first tier is less than the access payment for the second tier. Each decoder of the second tier has a greater decoding capability than each decoder of the first tier. Each tier of the plurality of tiers includes at least one decoder of the plurality of decoders. Each tier of the plurality of tiers further includes a queue for queueing endurance groups that are granted access to the at least one decoder. The at least one decoder is round robin allocated to the endurance groups of the queue if the access payment of each of the endurance groups of the queue is the same. The at least one decoder is allocated to an endurance group of the queue based on the number of tokens received. A first number of tokens is received for a first endurance group to access the at least one decoder and a second number of tokens is received for a second endurance group to access the at least one decoder. The first number of tokens is greater than the second number of tokens. The first endurance group is granted access to the at least one decoder before the second endurance group is granted access to the at least one decoder. The at least one decoder is round robin allocated to the endurance groups of the queue. The round robin allocation is in the order of highest access payment to lowest access payment.

In another embodiment, a data storage device includes a memory means having a plurality of endurance groups and a controller coupled to the memory device. The controller includes a first group of decoders and a second group of decoders. Each endurance group has a first syndrome weight threshold associated with access to the first group of decoders. Each endurance group has a second syndrome weight threshold associated with access to the second group of decoders. The controller is configured to grant access to the first group of decoders and the second group of decoders to an endurance group of the plurality of endurance group based on payment of tokens and adjust the first syndrome weight threshold, the second syndrome weight threshold, or both the first syndrome weight threshold and the second syndrome weight threshold.

The controller is further configured to allocate a plurality of tokens to each endurance group of the plurality of endurance groups. The controller is further configured to measure impact on quality of service (QoS) of the data storage device for each endurance group granted access to the first group of decoders and the second group of decoders. The adjusting includes increasing the first syndrome weight threshold, the second syndrome weight threshold, or both the first syndrome weight threshold and the second syndrome weight threshold. The adjusting includes decreasing the first syndrome weight threshold, the second syndrome weight threshold, or both the first syndrome weight threshold and the second syndrome weight threshold. The first group of decoders is associated with a first payment of tokens and the second group of decoders is associated with a second payment of tokens. The second payment of tokens is greater than the first payment of tokens. The decreasing a syndrome weight causes each endurance group to use the second group of decoders.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
    a memory device having a plurality of endurance groups; and
    a controller coupled to the memory device, wherein the controller includes at least one decoder, and wherein the controller is configured to:
        allocate a plurality of tokens to each endurance group of the plurality of endurance groups;
        receive a payment of tokens from one or more of the plurality of endurance groups to access the at least one decoder; and
        grant access to the at least one decoder to the one or more of the plurality of endurance groups based on the payment of tokens.

2. The data storage device of claim 1, wherein the allocation of the plurality of tokens to an endurance group of the plurality of endurance groups is based on a number of decoding clocks associated with the endurance group.

3. The data storage device of claim 1, wherein the allocation of the plurality of tokens to an endurance group of the plurality of endurance groups is based on an allocated power associated with the endurance group.

4. The data storage device of claim 1, wherein the allocation of the plurality of tokens to an endurance group of the plurality of endurance groups is based on a combination of a number of decoding clocks and an allocated power associated with the endurance group.

5. The data storage device of claim 1, wherein each endurance group has a maximum allowance of tokens.

6. The data storage device of claim 1, wherein the at least one decoder includes at least two queues, wherein each of the at least two queues is associated with a priority for decoding, wherein a first queue has a first priority and second queue has a second priority, and wherein the at least one decoder prioritizes the first priority over the second priority.

7. The data storage device of claim 1, wherein each endurance group spends a different number of tokens of the plurality of tokens based on a data type of the endurance group, and wherein the data type includes backed up data, fast fail data, and data to be retrieved.

8. The data storage device of claim 1, wherein an allowance of bandwidth to an endurance group of the plurality of endurance groups is based on one or more of a size of the endurance group, a data type of the endurance group, and an overall usage of the endurance group.

9. A data storage device, comprising:
a memory device having a plurality of endurance groups; and
a controller coupled to the memory device, wherein the controller includes a plurality of decoders, the plurality of decoders comprising a plurality of tiers based on power consumption and correction capability, and wherein the controller is configured to:
allocate a number of tokens to each of the plurality of endurance groups;
receive a number of tokens from an endurance group of the plurality of endurance groups to access a decoder of the plurality of decoders, wherein each decoder of the plurality of decoders is associated with a tier of a plurality of tiers, wherein the number of tokens corresponds to an access payment for each tier of the plurality of tiers; and
grant access to a decoder associated with the access payment to the endurance group.

10. The data storage device of claim 9, wherein the plurality of tiers includes at least a first tier and a second tier, wherein the access payment for the first tier is less than the access payment for the second tier, and wherein each decoder of the second tier has a greater decoding capability than each decoder of the first tier.

11. The data storage device of claim 9, wherein each tier of the plurality of tiers includes at least one decoder of the plurality of decoders, and wherein each tier of the plurality of tiers further includes a queue for queueing endurance groups that are granted access to the at least one decoder.

12. The data storage device of claim 11, wherein the at least one decoder is round robin allocated to the endurance groups of the queue if the access payment of each of the endurance groups of the queue is the same.

13. The data storage device of claim 11, wherein:
the at least one decoder is allocated to an endurance group of the queue based on the number of tokens received;
a first number of tokens is received for a first endurance group to access the at least one decoder and a second number of tokens is received for a second endurance group to access the at least one decoder;
the first number of tokens is greater than the second number of tokens; and
the first endurance group is granted access to the at least one decoder before the second endurance group is granted access to the at least one decoder.

14. The data storage device of claim 11, the at least one decoder is round robin allocated to the endurance groups of the queue, wherein the round robin allocation is in an order of highest access payment to lowest access payment.

15. A data storage device, comprising:
memory means, wherein the memory means has a plurality of endurance groups;
a controller coupled to the memory means, wherein the controller includes a first group of decoders and a second group of decoders, wherein each endurance group has a first syndrome weight threshold associated with access to the first group of decoders, wherein each endurance group has a second syndrome weight threshold associated with access to the second group of decoders, wherein the controller is configured to:
grant access to the first group of decoders and the second group of decoders to an endurance group of the plurality of endurance group based on payment of tokens; and
adjust the first syndrome weight threshold, the second syndrome weight threshold, or both the first syndrome weight threshold and the second syndrome weight threshold.

16. The data storage device of claim 15, the controller is further configured to allocate a plurality of tokens to each endurance group of the plurality of endurance groups.

17. The data storage device of claim 15, the controller is further configured to measure impact on quality of service (QoS) of the data storage device for each endurance group granted access to the first group of decoders and the second group of decoders.

18. The data storage device of claim 15, wherein the adjusting comprising increasing the first syndrome weight threshold, the second syndrome weight threshold, or both the first syndrome weight threshold and the second syndrome weight threshold.

19. The data storage device of claim 15, wherein the adjusting comprising decreasing the first syndrome weight threshold, the second syndrome weight threshold, or both the first syndrome weight threshold and the second syndrome weight threshold.

20. The data storage device of claim 19, wherein the first group of decoders is associated with a first payment of tokens and the second group of decoders is associated with a second payment of tokens, wherein the second payment of tokens is greater than the first payment of tokens, and wherein the decreasing a syndrome weight causes each endurance group to use the second group of decoders.

* * * * *